United States Patent
Jang et al.

(10) Patent No.: US 7,640,035 B2
(45) Date of Patent: Dec. 29, 2009

(54) WIRELESS HOME LAN SYSTEM USING MULTIPLE ANTENNAS

(75) Inventors: Kyung-Hun Jang, Suwon-si (KR); Pil-Yong Hwang, Yongin-si (KR); Jin-Bong Chang, Daejeon (KR); Choong-Hun Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 468 days.

(21) Appl. No.: 11/179,722

(22) Filed: Jul. 12, 2005

(65) Prior Publication Data

US 2006/0009208 A1   Jan. 12, 2006

(30) Foreign Application Priority Data

Jul. 12, 2004   (KR)   .................. 10-2004-0053948

(51) Int. Cl.
*H04M 1/00*   (2006.01)

(52) U.S. Cl. .................. 455/551; 455/552.1; 455/562.1; 455/464; 370/328; 370/338; 370/339

(58) Field of Classification Search .................. 455/551, 455/562.1, 90.3, 552.1, 464, 19, 82; 370/328, 370/338, 339
See application file for complete search history.

(56) References Cited

U.S. PATENT DOCUMENTS

| | | | |
|---|---|---|---|
| 5,157,660 A * | 10/1992 | Kuwahara et al. | 370/314 |
| 5,289,526 A | 2/1994 | Chymyck et al. | |
| 6,738,641 B1 | 5/2004 | Elsasser | |
| 6,807,405 B1 * | 10/2004 | Jagger et al. | 455/296 |
| 6,812,824 B1 * | 11/2004 | Goldinger et al. | 340/10.1 |
| 6,965,605 B1 * | 11/2005 | Amos et al. | 370/401 |
| 2001/0054985 A1 | 12/2001 | Jones et al. | |
| 2004/0014466 A1 | 1/2004 | Jesse et al. | |
| 2004/0150521 A1 * | 8/2004 | Stilp | 340/545.1 |
| 2004/0196834 A1 * | 10/2004 | Ofek et al. | 370/352 |
| 2007/0275595 A1 * | 11/2007 | Hazani et al. | 439/536 |

FOREIGN PATENT DOCUMENTS

| | | |
|---|---|---|
| EP | 1 085 773 | 3/2001 |
| EP | 1 308 864 | 5/2003 |
| WO | WO 2004/025887 | 3/2004 |

* cited by examiner

*Primary Examiner*—Tuan A Pham
(74) *Attorney, Agent, or Firm*—NSIP Law

(57) ABSTRACT

Disclosed herein is wireless home LAN system using multiple antennas, and a wireless access point (AP) apparatus in a communication system for providing a plurality of terminals contained in a closed specific area with a wireless access service that includes a plurality of wireless modules arranged in the closed specific area at intervals of a predetermined distance, that are selectively activated, and a control module connected to the wireless modules by wire, for controlling communication performed in the area of the terminals and connection to an external network using the activated wireless modules. The apparatus selectively activates antennas in only a specific area requesting a communication service using a single controller and a plurality of antennas connected to the controller, such that it can solve performance anomalies and inter-cell frequency interference problems. Also, the apparatus controls propagation beams to concentrate on a minimum area, resulting in improved security.

12 Claims, 10 Drawing Sheets though the APs 13 and 15 use different channels (i.e. channel #11 and channel #1), an unexpected overlapping portion occurs, resulting in signal interference. Furthermore, when APs 15 and 17 use the same channel (e.g. channel #1), serious interference may be encountered in a boundary area.
WIRELESS HOME LAN SYSTEM USING MULTIPLE ANTENNAS

PRIORITY

This application claims priority to an application entitled "WIRELESS HOME LAN SYSTEM USING MULTIPLE ANTENNAS", filed in the Korean Intellectual Property Office on Jul. 12, 2004 and assigned Serial No. 2004-53948, the contents of which are hereby incorporated by reference.

BACKGROUND OF THE INVENTION

1. Field of the Invention

The present invention relates to a wireless communication system, and more particularly to an Access Point (AP) for use in a wireless LAN system.

2. Description of the Related Art

Recently, the IEEE 802.11a/g has been established as the latest Wireless Local Area Network (WLAN) technology standard, in regard to high-speed wireless equipment capable of supporting a transfer rate of 54 Mbps that has recently been introduced to the market. There is increasing user demand for networking technologies of household appliances contained in a home network, which has been proposed as a major application of WLAN technologies. Many developers have conducted intensive research into WLAN technologies in an attempt to increase wireless speed and data throughput, and currently attempts are under way to raise wireless link speeds to a predetermined speed of 200 Mbps using Multiple Input Multiple Output (MIMO) technology of the IEEE 802.11 TGb standardization group. The Medium Access Control (MAC) layer applies a resource request scheme to a random access scheme in order to increase efficiency of radio resources, such that the MAC output can be increased by 80%.

FIG. 1 is a conceptual diagram illustrating a conventional wireless LAN environment. Referring to FIG. 1, a plurality of APs (Access Points) 11, 13, 15, and 17 form individual cells 11a, 13a, 15a, and 17a, respectively. In this case, al In order to implement a wireless home LAN network system, inter-cell interference generated during cell planning and a performance anomaly phenomenon must be removed. However, if a multi-cell AP environment is implemented using a conventional IEEE 802.11 standard, an inter-cell frequency inference phenomenon and a performance anomaly generated at a cell edge are generated, resulting in a reduced output level and increased transmission delays.

The cell-planning scheme for constructing conventional wireless home LAN network systems may have difficulty in arranging cells, and may unexpectedly encounter coverage holes. A mobile terminal is unable to receive radio signals in the coverage hole, resulting in a communication failure. When a terminal desires to move from a current access AP to another AP in the wireless home LAN network, probing, re-association, and authentication functions must be applied to the AP, resulting in considerably longer handoff latency.

The AP covers a large-sized cell area in the conventional home LAN scheme. Therefore, radio signals from the AP may go outside of a home or building area if a home LAN or building LAN environment is so constructed, allowing communication packets between an AP and an authorized terminal to be received by an unauthorized terminal, resulting in a security problem.

SUMMARY OF THE INVENTION

Therefore, the present invention has been made in view of the above problems, and it is an object of the present invention to provide a communication system for separating a wireless device and a MAC device from each other during cell-planning for implementation of a wireless LAN, such that inter-cell interference and performance anomalies can be eliminated.

It is another object of the present invention to provide a communication system for variably constructing a single AP with a MAC device and a plurality of wireless devices without a MAC device to take charge of a predetermined zone, to efficiently manage a service area.

It is yet another object of the present invention to provide a communication system for covering a relatively wide area using a single AP and a single MAC device, resulting in reduction of overall system construction costs.

It is yet another object of the present invention to provide a communication system for connecting a plurality of RF (Radio Frequency) devices to a user-desired position, to efficiently use RF resources.

It is yet another object of the present invention to provide a communication system for reducing a service area of an RF device to a relatively small area, resulting in improved security.

It is yet another object of the present invention to provide a communication system for measuring density of terminals, and dynamically assign channels to the terminals according to the measured result, resulting in effective load balancing.

In accordance with one aspect of the present invention, the above and other objects can be accomplished by providing a wireless Access Point (AP) apparatus in a communication system for providing a plurality of terminals contained in a closed specific area with a wireless access service, having a plurality of wireless modules arranged in the closed specific area at intervals of a predetermined distance that are selectively activated; and a control module connected to the wireless modules by wire, for controlling communication performed in the area of the terminals and connection to an external network using the activated wireless modules.

Preferably, the wireless modules are fixed to a ceiling or wall defining the area, and the wireless modules form a plurality of cells indicative of communication enabled areas of the terminals when they are activated, and at the same time the cells are arranged to overlap with each other.

Preferably, the control module assigns the same channel or different channels to the wireless modules according to distribution of the terminals contained in the area. Further, it is preferable that the control module assigns the same or different channels to the wireless modules according to distribution of the terminals contained in the area, and assigns a default channel to a neighboring cell when traffic load is concentrated on a cell of a wireless module assigned a specific channel, resulting in uniform traffic distribution.

The wireless modules will preferably each include an A/D converter for converting an analog signal received from each terminal into a digital signal; and a signal processing unit for generating a control signal including Reception Signal Strength Indicator (RSSI) of the terminal, an assigned channel index, and an antenna index, and transmitting the control signal to the control module.

Preferably, the control module includes a plurality of MAC (Medium Access Control) units for every channel for managing a plurality of antennas assigned the same channel and a switch module for processing a control signal received from each wireless module, and transmitting the processed result to the MAC units.

In accordance with another aspect of the present invention, the wireless modules each include a plurality of wall-outlet modules fixed to a ceiling or wall defining the area and a plug-type antenna module connected to the wall-outlet modules.

Preferably, the antenna module is connected to the wall-outlet modules, and is activated by exchanging a signal with the control module. The wall-outlet modules will further preferably each form cells indicative of communication enabled areas when they are connected to the antennas, and are arranged to enable the cells to overlap each other.

Preferably, the control module assigns the same or different channels to the wireless modules according to distribution of the terminals contained in the area, and assigns a default channel to a neighboring cell when traffic load is concentrated on a cell of a wireless module assigned a specific channel, resulting in uniform traffic distribution. The control module will preferably assign the same or different channels to the wireless modules according to distribution of the terminals contained in the area.

Preferably, the wireless modules each include an A/D converter for converting an analog signal received from each terminal into a digital signal when connected to the antenna module and a signal processing unit for generating a control signal including Reception Signal Strength Intensity (RSSI) of the terminal, an assigned channel index, and an antenna index, and transmitting the control signal to the control module.

Preferably, the control module includes a plurality of MAC (Medium Access Control) units for every channel for managing a plurality of antenna modules assigned the same channel and a switch module for processing a control signal received from each wall-outlet module, and transmitting the processed result to the MAC units. The control module will preferably include a plurality of MAC (Medium Access Control) units for every channel for managing a plurality of antenna modules assigned the same channel, and a switch module for processing a control signal received from the wireless modules and transmitting the processed result to the control module.

In accordance with yet another aspect of the present invention, the switch module is integrated in the control module or is separated from the control module, such that it is connected to the control module via one data bus, and is connected to the wireless modules via individual data buses.

Preferably, the wireless AP apparatus further includes a plurality of switch modules connected to the control module via individual data buses, and connected to a predetermined number of wireless modules via only one data bus branch.

Preferably, the number of MAC units increases or decreases according to the number of wireless modules.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
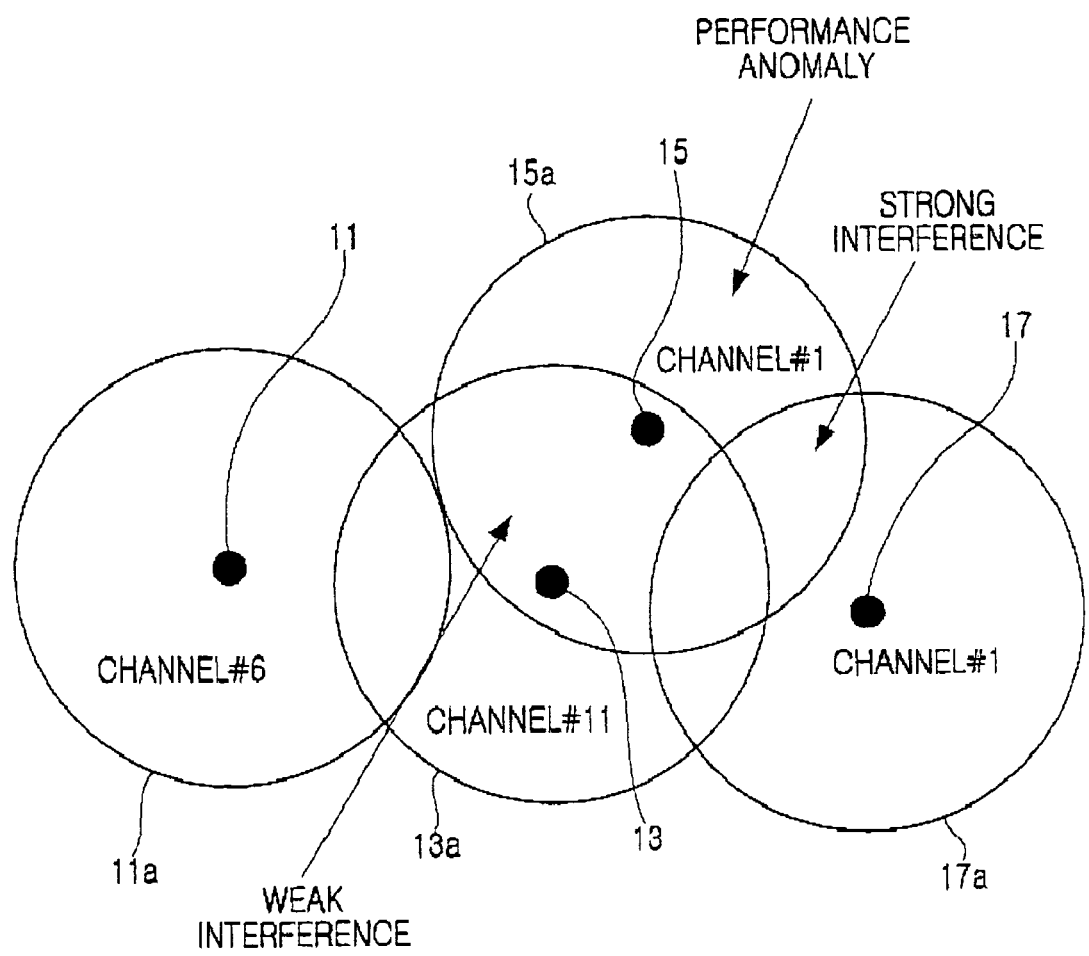
FIG. 1 is a conceptual diagram illustrating a conventional wireless LAN environment.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted to avoid making the subject matter of the present invention unclear.

Figure 2:
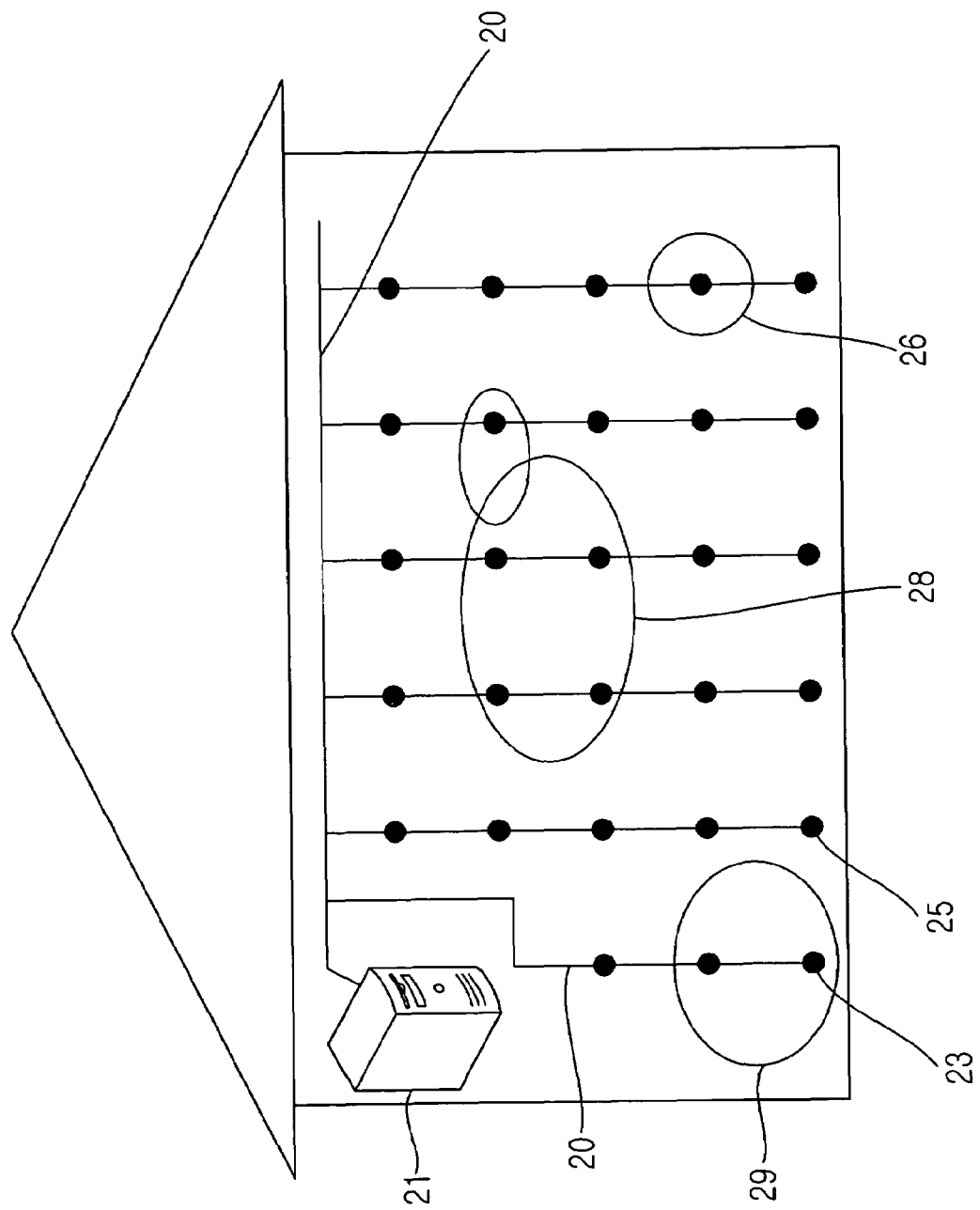
FIG. 2 depicts a wireless home LAN system in accordance with a preferred embodiment of the present invention.

FIG. 2 depicts a wireless home LAN system in accordance with a preferred embodiment of the present invention.

Referring to FIG. 2, a wireless home LAN system in accordance with a preferred embodiment of the present invention includes a control agent 21, and a plurality of wall outlet modules 25 distributed in a predetermined area and connected to the control agent 21 via data bus 20. An antenna module is connected to each wall outlet module 25, forming a pico-cell service area 26. In this case, if the same channel is assigned to some neighboring antenna modules 23, wider merging cells, e.g. 28 and 29, can be formed.

Figure 3:
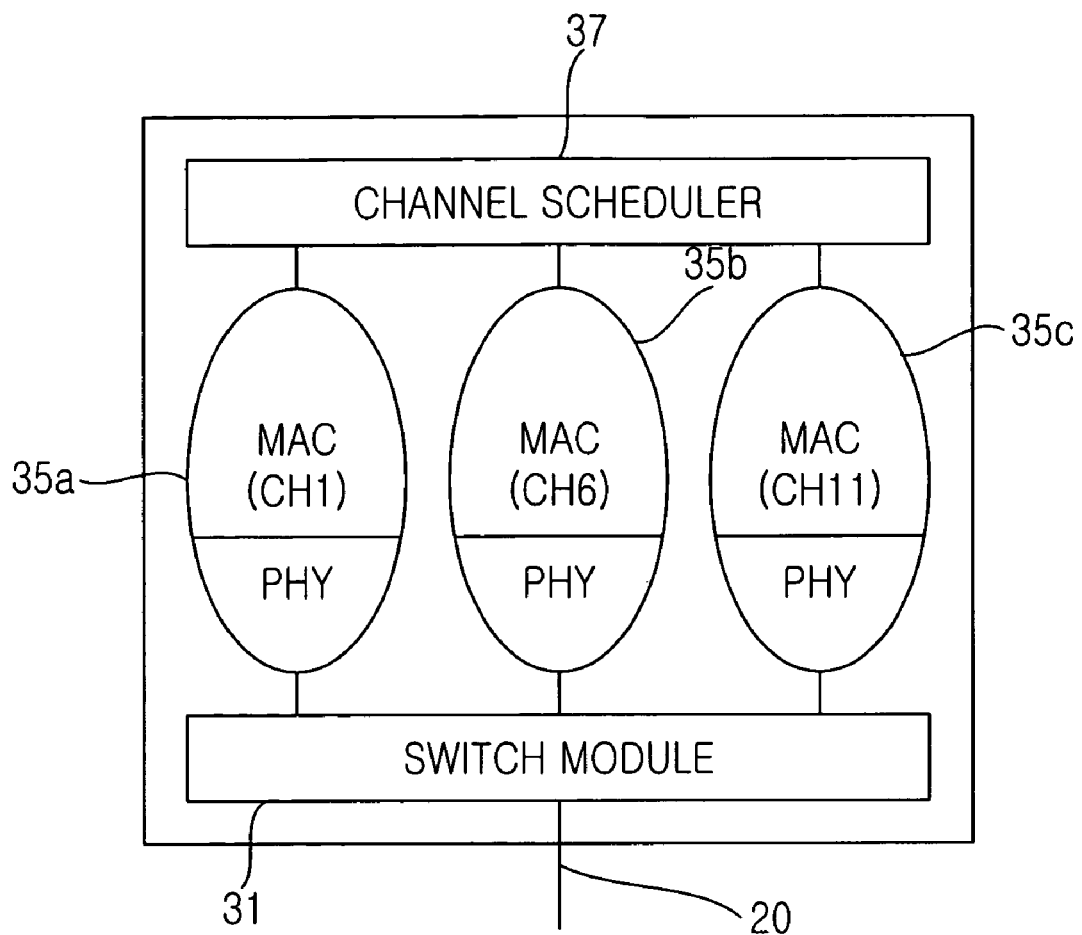
FIG. 3 is a block diagram illustrating internal elements of a control agent of FIG. 2 in accordance with a preferred embodiment of the present invention.

FIG. 3 is a block diagram illustrating internal elements of a control agent of FIG. 2 in accordance with a preferred embodiment of the present invention. The control agent 21 includes a switch module 31 for processing a control message received from each antenna module 23 (described in FIG. 4) over a control line of the data bus 20, a plurality of MAC units 35a, 35b, and 35c for processing data of individual channels according to a control signal of the switch module 31, and a channel scheduler 37 for assigning channels to individual antenna modules 23.

The number of MAC units may increase or decrease in response to the number of the antenna modules.

Figure 4:
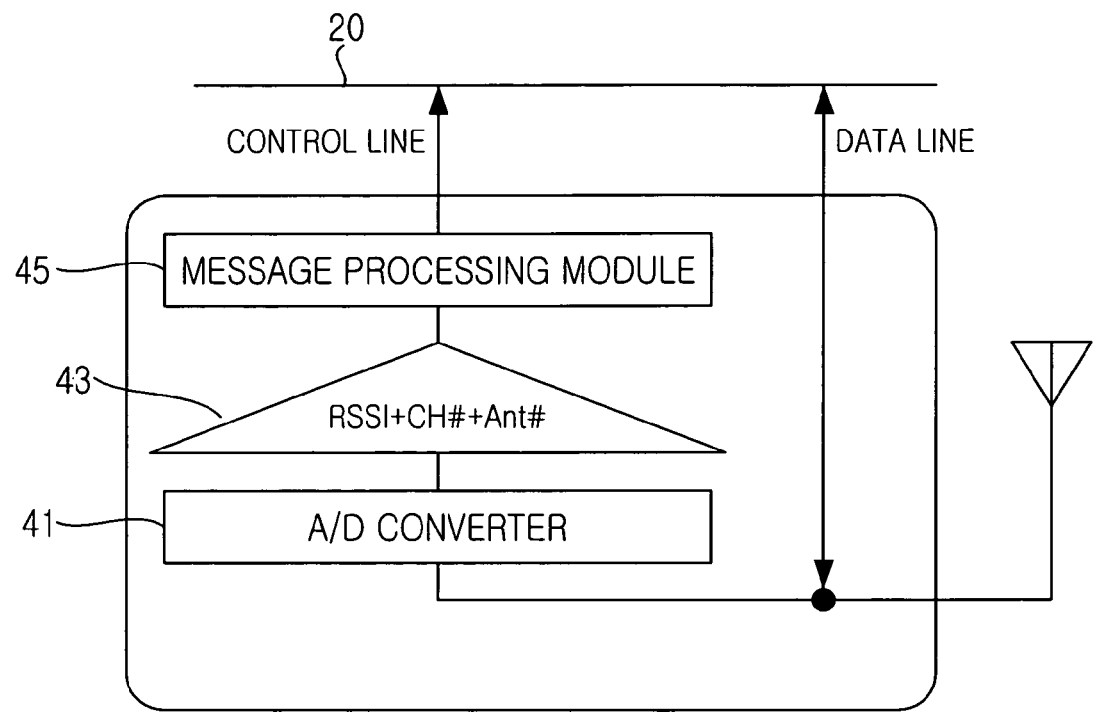
FIG. 4 is a block diagram illustrating an antenna unit for use in a wireless home LAN system in accordance with a preferred embodiment of the present invention.

FIG. 4 is a block diagram illustrating an antenna unit for use in a wireless home LAN system in accordance with a preferred embodiment of the present invention. Referring to FIG. 4, the antenna module 23 includes an A/D converter 41 for converting a signal received from a terminal (not shown) into a digital signal; a control signal generator 43 for receiving the digital signal from the A/D converter 41, combining Received Signal Strength Indicator (RSSI) of the received signal, a used channel index (CH#), and a corresponding antenna index (Ant#), thereby generating a control signal; and a second message processing module 45 for processing the control signal generated from the control signal generator 43 in the form of a message, and transmitting the processed result to the control agent 21.

The antenna module 23 connected to the wall-outlet module 25 forms a pico-cell service area 26. The control agent 21 includes base-band and MAC devices for coping with individual channels, such that it dynamically assigns channels or ports to the antennas.

Figure 5:
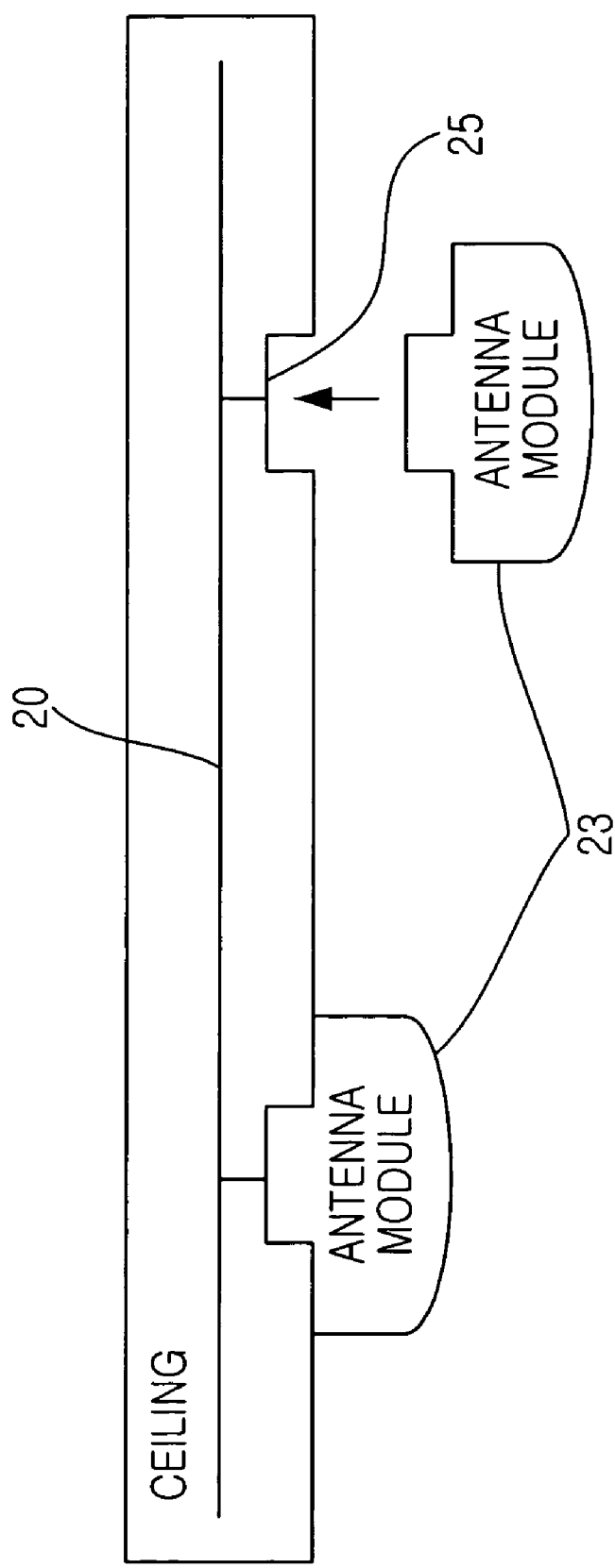
FIG. 5 is a conceptual diagram illustrating a method for connecting antenna modules to wall outlet modules of a wireless home LAN system in accordance with a preferred embodiment of the present invention.

FIG. 5 is a conceptual diagram illustrating a method for connecting antenna modules to wall outlet modules of a wireless home LAN system in accordance with a preferred embodiment of the present invention. The wall outlet modules 25 are fixed to a ceiling or wall of a home. Therefore, a cell area is determined by the wall outlet modules connected to the antenna modules 23.

Figure 6:
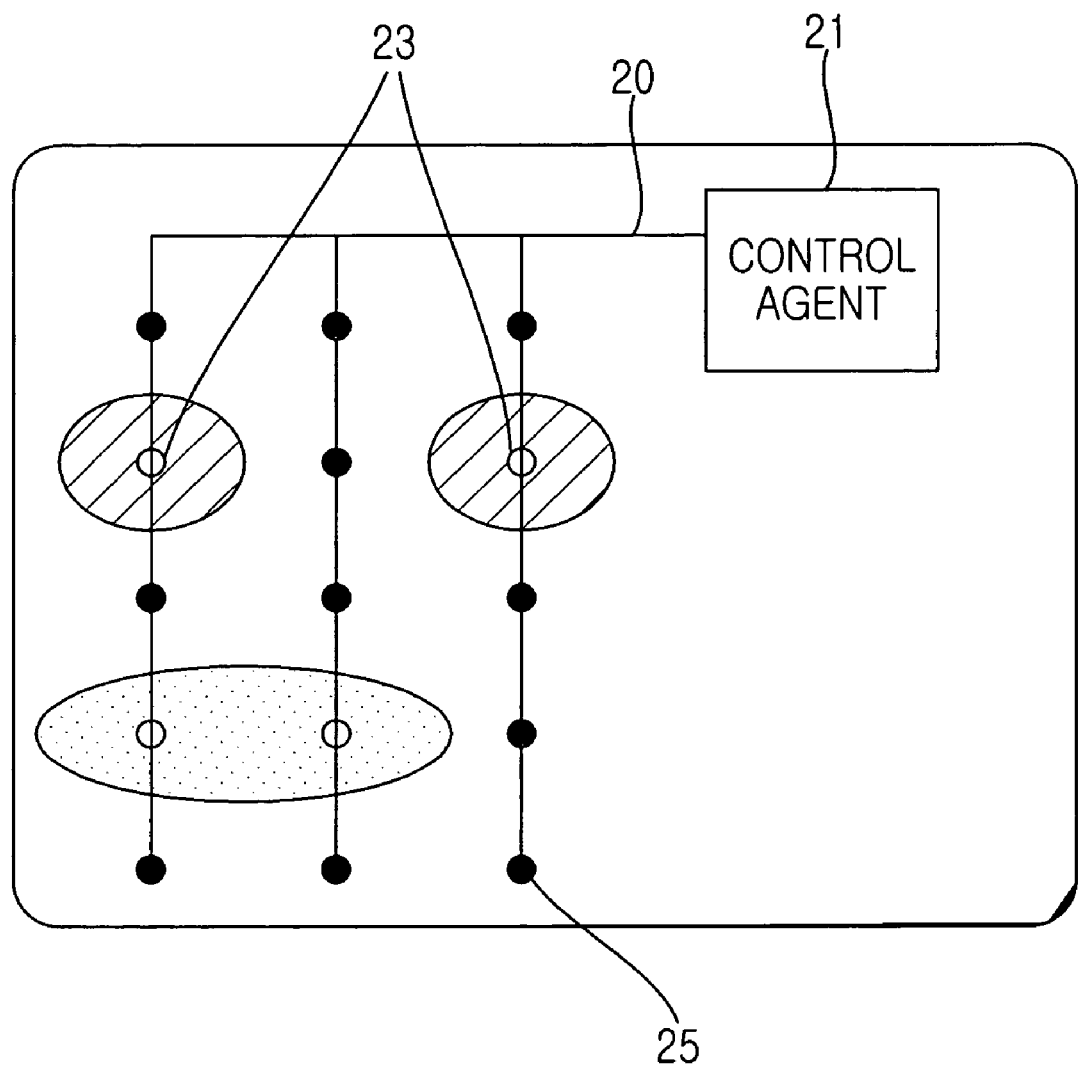
FIG. 6 is a conceptual diagram illustrating an exemplary case in which the same channel is assigned to a plurality of wall outlet modules, each of which includes an antenna module, in a wireless home LAN system in accordance with a preferred embodiment of the present invention.

FIG. 6 is a conceptual diagram illustrating an exemplary case in which the same channel is assigned to a plurality of wall outlet modules 25, each of which includes an antenna module 23, in a wireless home LAN system in accordance with a preferred embodiment of the present invention. Referring to FIG. 6, four antenna modules 23 are mounted to wall-outlet modules 25 positioned at predetermined positions, such that they provide service over the same channel. In this case, all the antenna modules 23 are assigned the same channel (e.g. channel #6), such that they are managed by the same MAC unit. For example, if the four antenna modules 23 are assigned a predetermined channel (channel #6), all the antenna modules are managed by the MAC unit 35b shown in FIG. 3.

Figure 7:
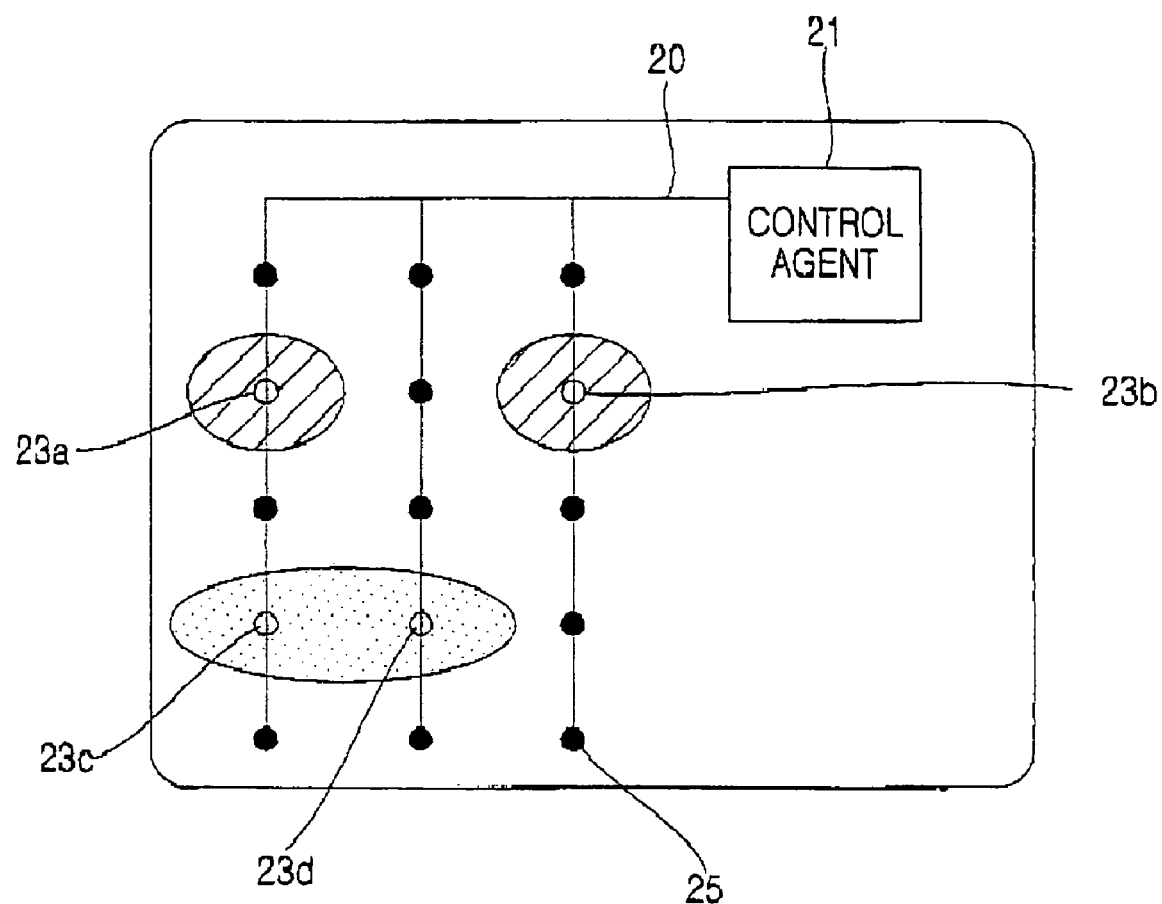
FIG. 7 is a conceptual diagram illustrating different channels assigned to a plurality of wall outlet modules, each of which includes an antenna module, in a wireless home LAN system in accordance with a preferred embodiment of the present invention.

FIG. 7 is a conceptual diagram illustrating different channels assigned to a plurality of wall outlet modules, each of which includes an antenna module, in a wireless home LAN system in accordance with a preferred embodiment of the present invention. Referring to FIG. 7, two antenna modules 23a and 23b are assigned the same channel (Channel #6), and other antenna modules 23c and 23d are assigned a predetermined channel (Channel #1). In this case, the antenna modules 23a and 23b are managed by the MAC unit 35b associated with the channel #6, and the other antenna modules 23a and 23d are managed by the MAC unit 35c associated with the channel #11.

Operation of the above-described wireless home LAN system will be described below.

Upon receiving data from a terminal, the antenna module 23 modulates a frequency of the received data, transmits modulated data to the control agent 21 over a data line, and, at the same time, transmits a data RSSI, a port number of a current antenna, and a channel number of the antenna to the control agent 21 over a control line using an antenna controller. Upon receiving information received over the control line, the control agent 21 estimates the amount of data of the current antenna, and changes a channel according to the estimated result. For example, provided that a currently-used channel of a specific antenna assigned to a port number '1' is determined to a number '1', and traffic distribution is required due to large amounts of data present in a corresponding channel, the control agent 21 changes the channel number of the antenna having the port number '1' to a channel number '6'.

Figure 8:
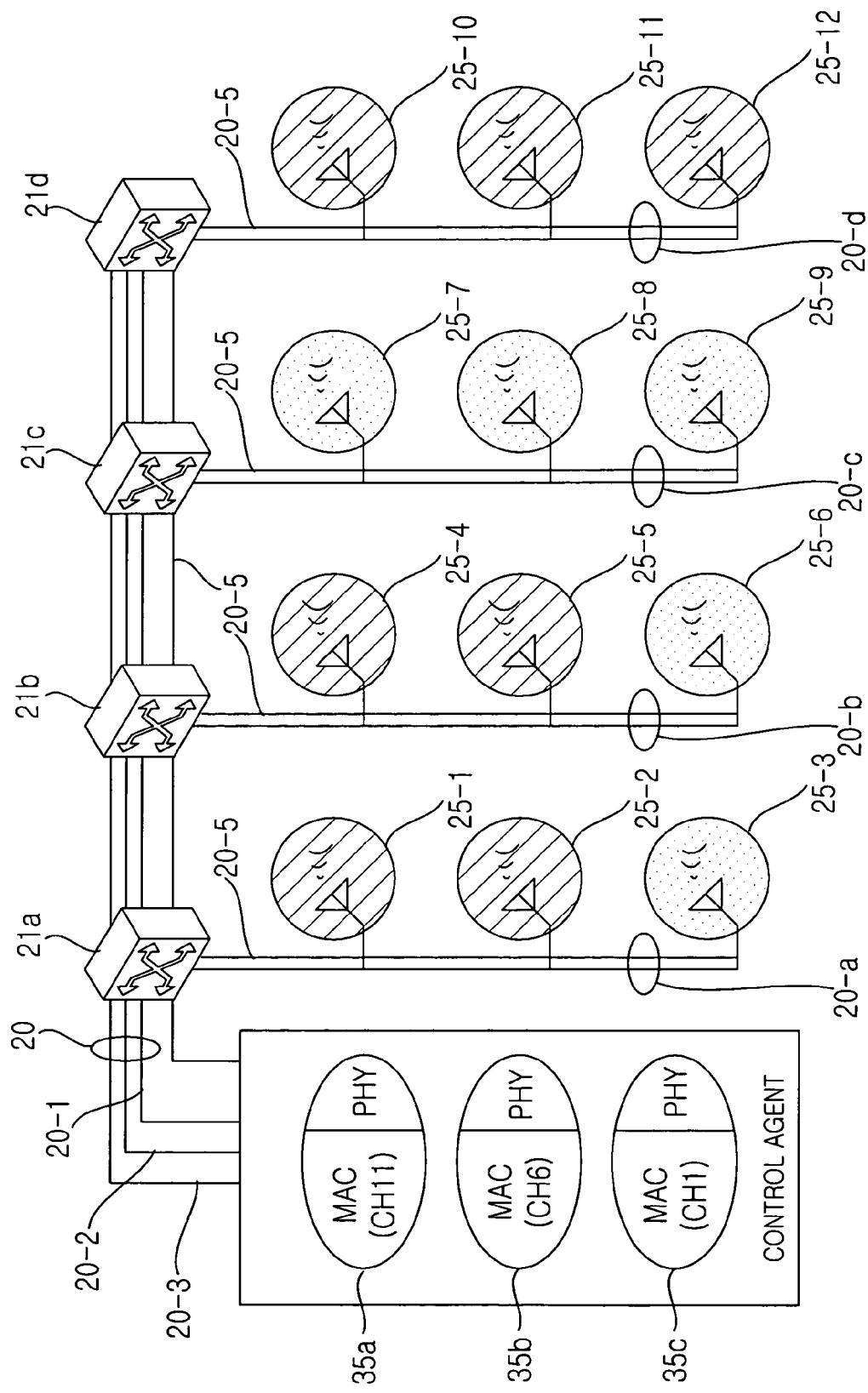
FIG. 8 is a block diagram illustrating a wireless home LAN system in accordance with another preferred embodiment of the present invention.

FIG. 8 is a block diagram illustrating a wireless home LAN system in accordance with another preferred embodiment of the present invention.

Referring to FIG. 8, in accordance with another preferred embodiment of the present invention, a plurality of switch modules 21a, 21b, 21c and 21d are assigned to a plurality of data bus branches 20a, 20b, 20c, and 20d, respectively, such that they control data communication with individual wall outlet modules 25 connected to individual data bus branches 20a, 20b, 20c, and 20d. In contrast, the aforementioned preferred embodiment of the present invention installs the switch module 31 in the control agent 21.

In this case, all the wall-outlet modules 25-1 to 25-12 transmit or receive control signals to/from the control agent 21 over a common control channel 20-5, and the wall outlet modules assigned the same channel share the same data channel. For example, the wall outlet modules 25-3, 25-6, 25-7, 25-8, and 25-9 assigned the channel #1 share the same data channel 20-1, the wall-outlet modules 25-2, 25-4, 25-5, and 25-11 assigned the channel #6 share the same data channel 20-2, and the wall-outlet modules 25-1, 25-10, and 25-12 assigned the channel #11 share the same data channel 20-3. Although wall-outlet modules assigned the same channel share only one data channel in accordance with another preferred embodiment of the present invention, one data channel can be provided to each wall-outlet module.

Although one switch module is assigned to each data bus branch using bus topology in accordance with another preferred embodiment of the present invention, the wall-outlet modules 25-1 to 25-12 are connected via individual data buses, such that they can be implemented in the form of star topology.

Figure 9:
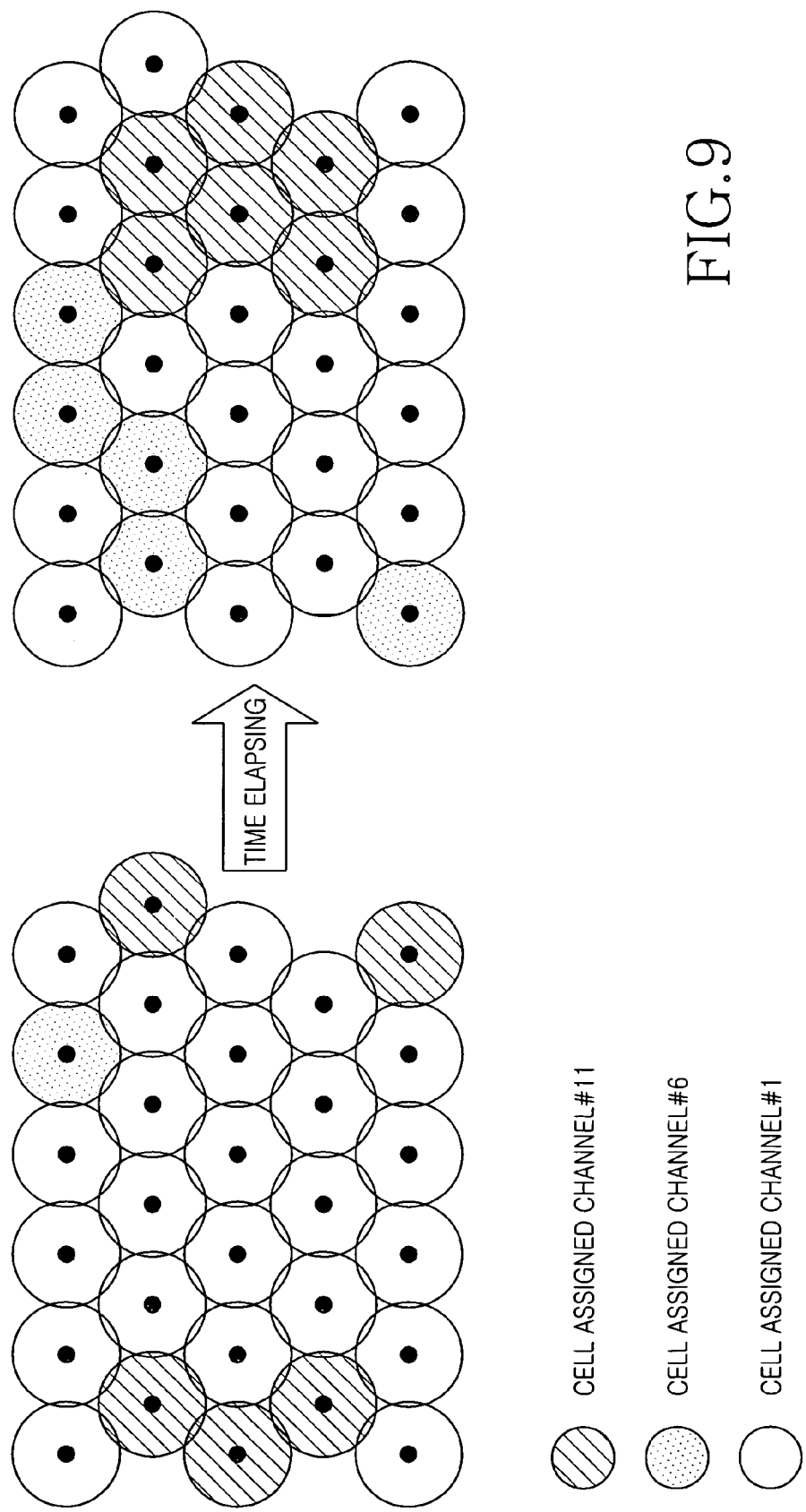
FIG. 9 is a conceptual diagram illustrating channel assignment variation concerning individual antennas according to a variation in distribution of terminals in accordance with the present invention.

FIG. 9 is a conceptual diagram illustrating channel assignment variation concerning individual antennas according to a variation in distribution of terminals in accordance with a preferred embodiment of the present invention. Referring to FIG. 9, an overall antenna is assigned channel number #1 to communicate with a target object. If a specific antenna requires higher output power due to increased amounts of data, it is assigned another channel. If a mobile terminal moves its antenna from the channel number #6 to another antenna number, it performs re-association using a default channel #1, so that there is no need to perform a scanning operation. Therefore, if a traffic pattern contained in a network is changed to another pattern, a channel assignment operation is dynamically operated according to the changed traffic pattern.

Figure 10:
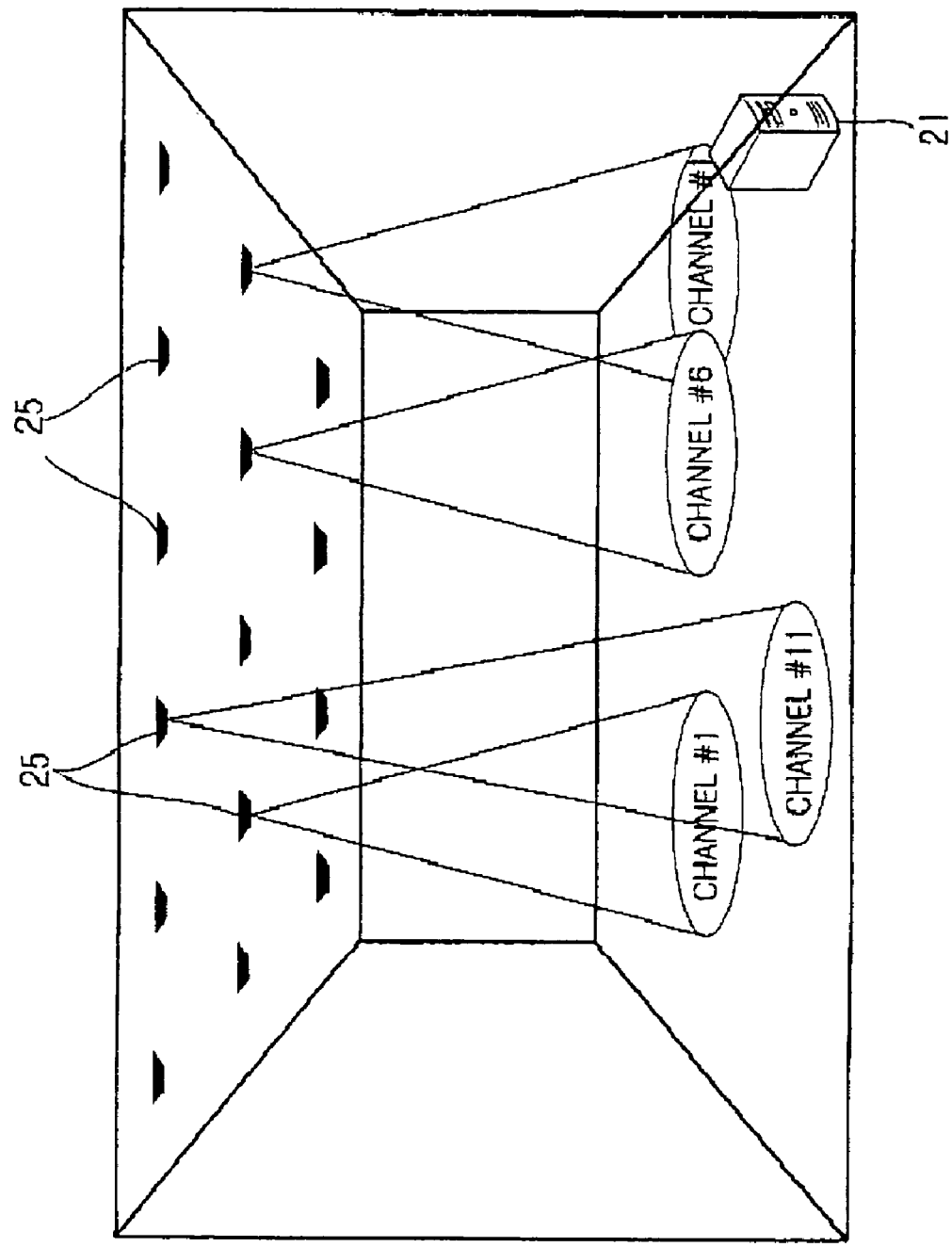
FIG. 10 is a conceptual diagram illustrating a method for providing only a necessary area with a wireless communication service in wireless home LAN system environments in accordance with the present invention.

FIG. 10 is a conceptual diagram illustrating a method for providing only a necessary area with a wireless communication service in wireless home LAN system environments in accordance with a preferred embodiment of the present invention. Referring to FIG. 10, the antenna modules 25 are mounted to the ceiling. Upon receiving a control signal from the control agent 21, the antenna modules 25 are selectively activated, such that a communication service is available for only a specific area.

As apparent from the above description, the wireless home LAN system according to the present invention selectively activates antennas in only a specific area requesting a communication service using a single controller and a plurality of antennas connected to the controller, such that it can solve performance anomalies and inter-cell frequency interference problems. Also, the wireless home LAN system controls propagation beams to be concentrated on a minimum area, resulting in improved security.

The wireless home LAN system distributes traffic load using a default channel when the traffic load is concentrated on a specific area, such that it can maintain a constant output level. The wireless home LAN system dynamically assigns resources to only a necessary area according to a communication environment of a cell area, such that it can effectively manage the resources. Furthermore, the wireless home LAN system has a very small-sized cell area and low transmission power, allowing a terminal to conserve energy and be used for a long period of time, and improve security.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless home Local Area Network (LAN) system comprising a plurality of antenna modules, the system comprising:
    a control agent comprising a plurality of Media Access Control (MAC) units for managing a control message received from one or more antenna modules assigned to one channel by one of the plurality of MAC units;
    a plurality of outlet modules, each of the plurality of outlet modules fixed to a ceiling or wall for defining an area; and
    a data bus for connecting between the control agent and the plurality of outlet modules;
    wherein the antenna modules are each connected to a corresponding one of the outlet modules and are adapted to be selectively activated upon receiving a control signal from the control agent, and
    the antenna modules transmit signal information to the control agent upon receipt of data from a terminal, and the control agent changes a channel of each corresponding antenna module according to an estimated amount of data of a current antenna using the signal information transmitted from the antenna modules.

2. The system of claim 1, wherein the system further comprising:
    a switch module included in the control agent for switching data transmission to the antennas modules and control agent, or a plurality of switch modules assigned to a plurality of data bus branches for controlling data communication with the outlet modules.

3. The system of claim 1, wherein the control agent assigns a same channel or different channels to the antenna modules according to distribution of terminals contained in the area.

4. The system of claim 1, wherein the control agent assigns a default channel to a neighboring cell where a traffic load is concentrated on a certain antenna module assigned a specific channel, to provide uniform traffic distribution.

5. The system of claim 1, wherein the data bus forms a bus topology or star topology.

6. The system of claim 1, wherein the antenna modules form a pico-cell service area.

7. The system of claim 1, wherein the signal information transmitted from the antenna modules comprises a Reception Signal Strength Indicator (RSSI) of the terminal, an assigned channel index, and an antenna index with data.

8. The system of claim 2, wherein the system comprising the switch module included in the control agent transmits and receives a control signal via a common channel between the control agent and the outlet modules.

9. The system of claim 1, wherein the system forms an Access Point (AP) system, and connects in cable the control agent with the outlet modules, and connects to an external network using the control agent.

10. A control agent apparatus for use in a wireless home Local Area Network (LAN) system comprising a plurality of antenna modules, a plurality of outlet modules, each of the plurality of outlet modules being fixed to a ceiling or wall for defining an area, and a data bus for connecting between the control agent apparatus and the plurality of outlet modules, wherein the antenna modules are each connected to a corresponding one of the outlet modules and are adapted to be selectively activated upon receiving a control signal from the control agent apparatus, the control agent apparatus comprising:
    a plurality of Media Access Control (MAC) units for managing the plurality of antenna modules, each MAC unit managing at least one antenna module assigned to one channel;
    a switch module for processing a control signal received from the antenna modules, and transmitting the processed result to the MAC units; and
    a channel scheduler for assigning a default channel to an individual antenna module.

11. The apparatus of claim 10, wherein the control agent apparatus assigns a same channel or different channels to the plurality of antenna modules according to distribution of terminals contained in the area.

12. An antenna module for use in a wireless home Local Area Network (LAN) system comprising a control agent comprising a plurality of Media Access Control (MAC) units for managing a control message received from at least one antenna module assigned to one channel by one of the plurality of MAC units, a plurality of outlet modules for receiving corresponding antenna modules, each of the plurality of outlet modules being fixed to a ceiling or wall for defining an area, and a data bus for connecting between the control agent and the plurality of outlet modules, the antenna module comprising:
    a control signal generator for generating a control signal including a Reception Signal Strength Indicator (RSSI) of a terminal, and an assigned channel index; and
    a message processing module for processing the control signal generated from the control signal generator in a form of a message, and transmitting the processed result to the control agent,
    wherein the antenna module is connected to a corresponding one of the plurality of outlet modules and is adapted to be selectively activated upon receiving a control signal from the control agent.

* * * * *